L. P. SIEVERS.
SPRING WHEEL.
APPLICATION FILED JUNE 1, 1911.

1,016,298.

Patented Feb. 6, 1912.

2 SHEETS—SHEET 1.

Witnesses

Inventor
L. P. Sievers
By
Attorneys

L. P. SIEVERS.
SPRING WHEEL.
APPLICATION FILED JUNE 1, 1911.
1,016,298.
Patented Feb. 6, 1912.
2 SHEETS—SHEET 2.
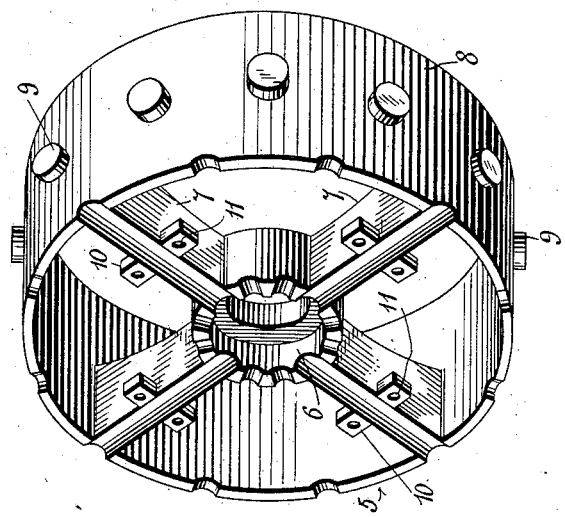
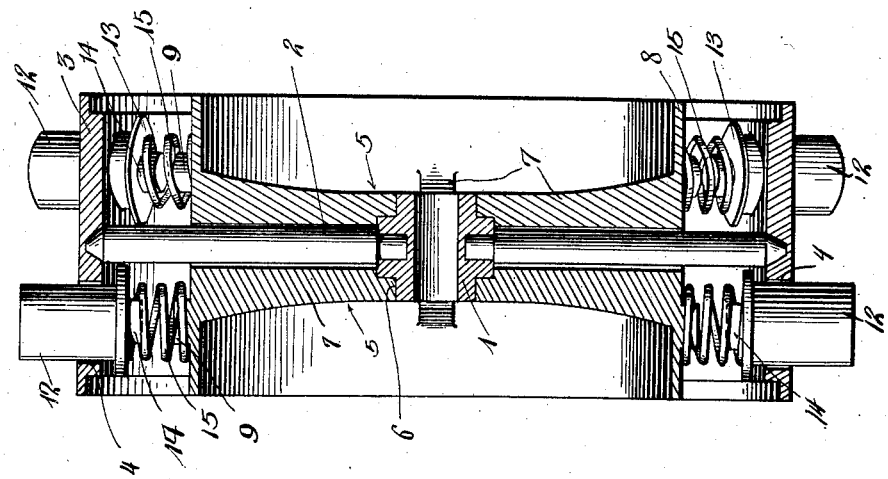
Witnesses
Ernest Crocker
Inventor
L. P. Sievers
By
Attorneys

UNITED STATES PATENT OFFICE.

LOUIS P. SIEVERS, OF LARCHWOOD, IOWA.

SPRING-WHEEL.

1,016,298.

Specification of Letters Patent.

Patented Feb. 6, 1912.

Application filed June 1, 1911. Serial No. 630,622.

*To all whom it may concern:*

Be it known that I, LOUIS P. SIEVERS, a citizen of the United States, residing at Larchwood, in the county of Lyon, State of Iowa, have invented certain new and useful Improvements in Spring-Wheels; and I do hereby declare the following to be a full, clear, and exact description of the invention, such as will enable others skilled in the art to which it appertains to make and use the same.

This invention relates to spring wheels, and has for its object to provide a device of this character which is simple in construction, durable and efficient in operation and one in which the use of the usual pneumatic tires is eliminated, but at the same time accomplishing the same results.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction, within the scope of the claim, may be resorted to without departing from the spirit or sacrificing any of the advantages of the invention.

Figure 1:
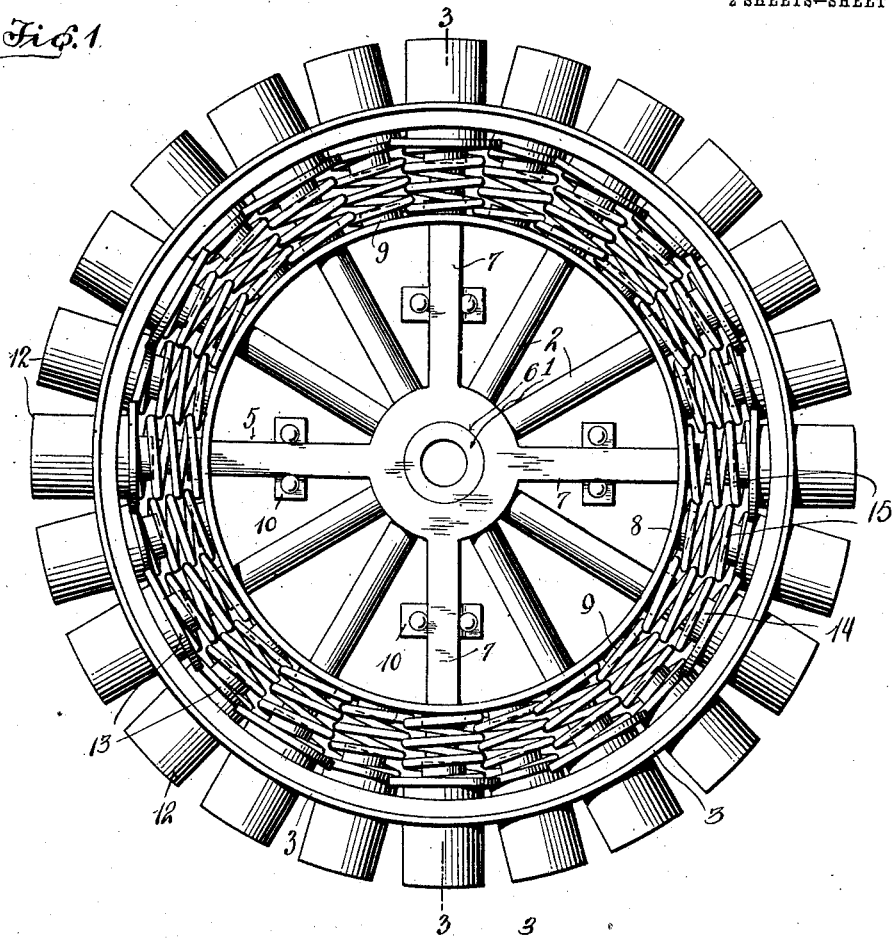
Figure 2:
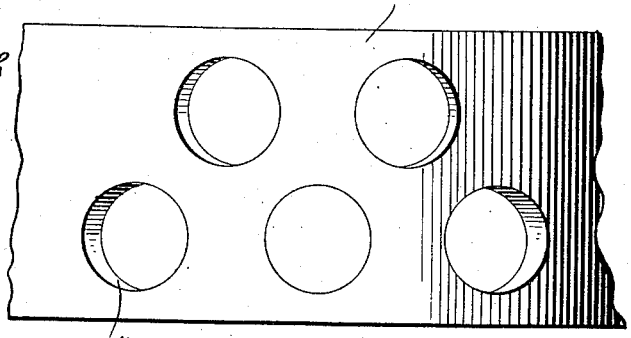

In the drawings:—Figure 1 is a side elevation of a wheel. Fig. 2 is a plan view of the tire portion of the wheel. Fig. 3 is a sectional view on line 3—3 of Fig. 1. Fig. 4 is a perspective view of the inner rim member.

Referring to the drawings, the numeral 1 designates a hub having radiating therefrom in the usual manner spokes 2. An outer rim 3 is provided and is secured to the spokes in any suitable manner. The rim 3 is provided with parallel rows of openings 4, said openings being arranged in staggered relation, the purpose of which will be hereinafter described. A pair of inner members 5 are provided, each of which consisting of a central opening 6, said opening being adapted to be fitted over the projecting portions of the hub 1, and are further provided with radial arms 7. Formed integral with the outer ends of the arms 7 are rims 8, said rims being provided with outwardly extending lugs 9. The lugs 9 of each member 5, when secured upon the spokes 2 assume staggered relation, each lug being so arranged as to be directly under the staggered openings 4 formed in the outer rim 3. Each arm 7 is formed with oppositely disposed ears 10 having openings 11 formed therein and adapted to be arranged in registered relation when the members 5 are confronting and when said ears embrace certain of the spokes 2. Bolts are then passed through the openings to securely hold the members 5 in their proper position upon the wheel.

Slidably mounted in the openings 4 of the rims 3 are cylindrical plugs 12, each of which have formed at their inner ends flanges 13 and inwardly directed central lugs 14, said lugs being arranged directly in alinement with the lugs 9 formed upon the rims 8. Placed between the outer rims 3 and the inner rims 8 are coil springs 15 the upper terminals of said springs resting against the inner surface of the flanges 13 and the lower terminals resting upon the outer surface of the inner rims 8, the lugs 9 and 14 acting to hold the springs against accidental displacement.

From the foregoing description it will be seen that a wheel has been provided which is particularly adapted for use upon automobiles or heavy vehicles wherein it is desired to provide the same with means equivalent to the usual characteristics of pneumatic tires.

What is claimed, is:—

In a spring wheel the combination with a hub having spokes radiating therefrom, a rim supported and spaced from the hub by said spokes, a pair of parallel rows of openings formed in said rim and being arranged in staggered relation, a pair of members having radial arms provided with oppositely disposed ears, inner rims formed integral with the outer ends of said arms, outwardly projecting lugs formed upon the outer face of the inner rims and being arranged in staggered relation, plugs slidably mounted in the openings formed in the outer rim and positioned directly over the lugs upon the inner rims, said plugs being provided with flanges, coil springs placed between said rims and having their upper terminals resting against said flanges and their lower terminals resting against the inner rims, said springs being held against accidental displacement by the lugs, and means passing through the oppositely disposed ears for clamping the pair of members to certain of the spokes.

In testimony whereof, I affix my signature, in presence of two witnesses.

LOUIS P. SIEVERS.

Witnesses:
G. T. HAGGARDT,
O. C. SCHUMANN.

Copies of this patent may be obtained for five cents each, by addressing the "Commissioner of Patents, Washington, D. C."